June 5, 1956  S. M. MERCIER  2,748,918
BELT CONVEYER SYSTEM WITH MULTIPLE RELATIVELY
MOVABLE LOADING DEVICES
Filed April 3, 1952  2 Sheets-Sheet 1
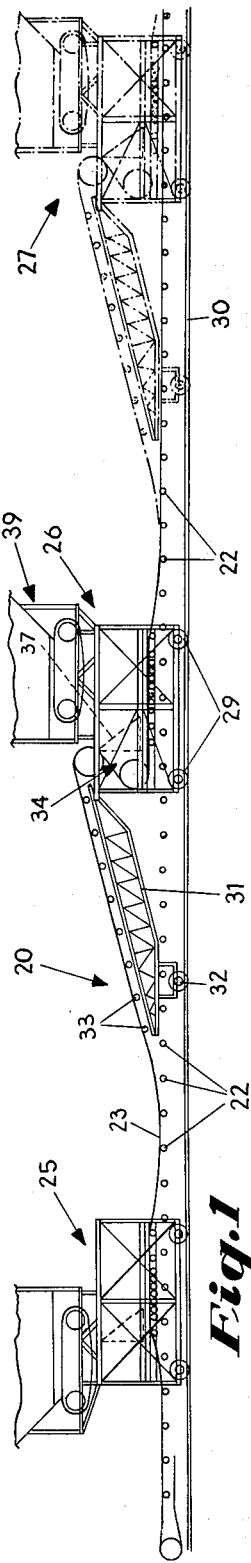
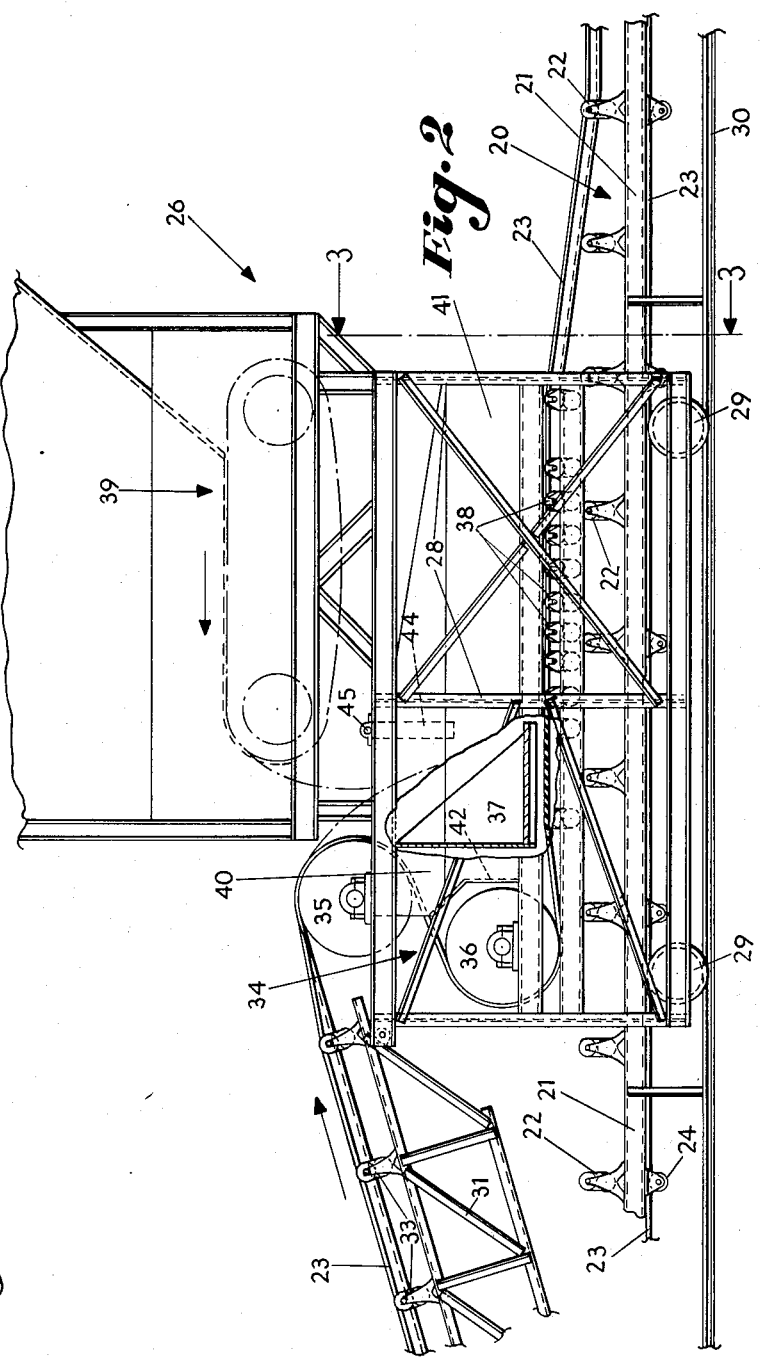
INVENTOR:
STANLEY M. MERCIER,
BY
ATT'Y.

United States Patent Office 2,748,918
Patented June 5, 1956

2,748,918

BELT CONVEYER SYSTEM WITH MULTIPLE RELATIVELY MOVABLE LOADING DEVICES

Stanley M. Mercier, Bexley, Ohio, assignor to The Jeffrey Manufacturing Company, a corporation of Ohio Application April 3, 1952, Serial No. 280,246

9 Claims. (Cl. 198—58)

This invention relates to a belt conveyor system in which the working run of an endless belt is loaded with material at a plurality of spaced positions or stations, at least one of which is relatively adjustable along the length of the conveyer.

An object of the invention is to provide an improved loading device in a system of the above mentioned type, in which loading device the working run of the belt is lifted from the normal belt supporting idlers of the conveyer and carried across cushioning idlers, and in which there is a belt tripper preceding the cushioning idlers, to the end that material previously delivered to the belt will be discharged from the belt as it travels over the tripper, such material together with added material being then redelivered to the belt as it travels over the cushioning idlers.

A further object of the invention is to provide apparatus as above described in which there is a material box interposed between the tripper and the cushioning idlers which will accumulate material and thereby provide a chute formed of the material being conveyed to aid in the delivery of the material discharged from the belt, as well as the added material, onto the cushioning idlers.

Still another object of the invention is to provide a system of the general type above described in which the loading device includes skirt means, the bottom edges of which are closely adjacent the belt as it travels over the cushioning idlers, thereby preventing spillage of said material as it is delivered over the tripper and supplemented by additional feeding or delivery means.

A further object of the invention is to provide an improved loading device for a belt conveyor having a belt tripper followed by cushioning idlers in which in a more specific aspect there is a hopper positioned above the cushioning idlers with skirts extending down close to the belt position above said cushioning idlers, and in a still more specific aspect of the invention there is also a chute forming material box interposed between the belt tripper and the cushioning idlers.

Other objects of the invention will appear hereinafter, the novel features and combinations being set forth in the appended claims.

In the accompanying drawings:

Fig. 1 is a diagrammatic side elevational view of that portion of a conveyer system incorporating features of my invention;

Fig. 2 is an enlarged elevational view of one of the intermediate feeding devices, with parts broken away and showing features of my invention.

Figure 3:
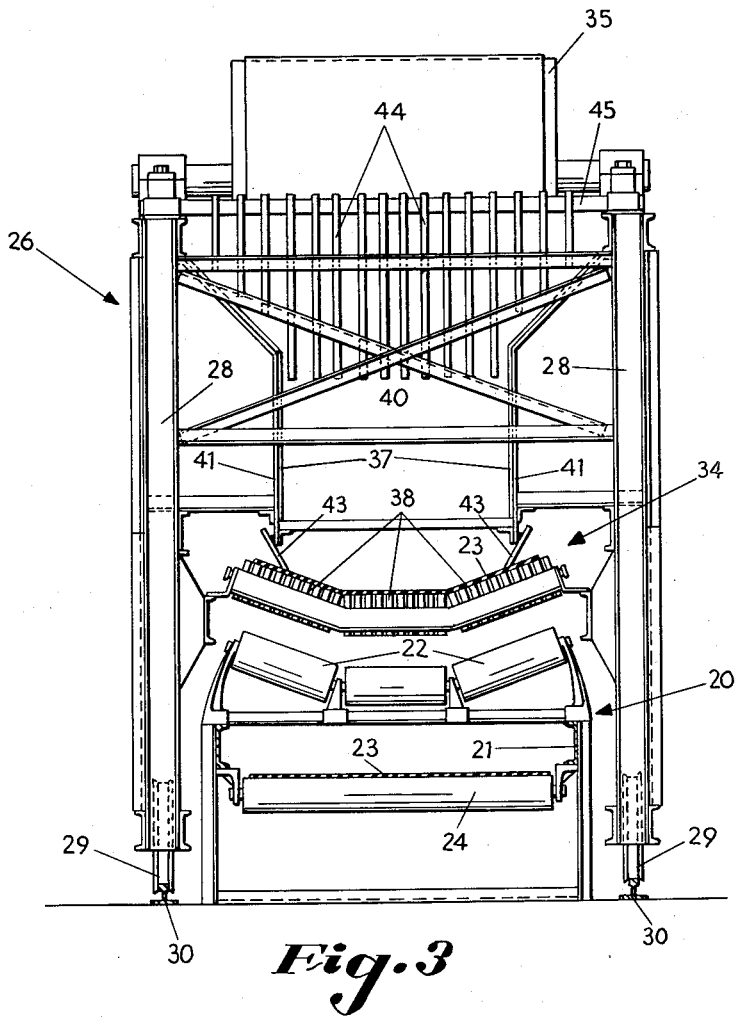
Fig. 3 is a sectional view, with parts omitted, taken on the line 3—3 of Fig. 2, looking in the direction of the arrows.

The invention herein disclosed and claimed constitutes an improvement on the system which is disclosed in the patent to Gust Weggum, No. 2,554,077, dated May 22, 1951, and it is to be understood that unless a contrary fact is indicated by the drawings or description the complete system follows that disclosed in said patent.

It may additionally be pointed out that the system disclosed in said patent is claimed in co-pending Weggum application, Serial No. 141,632, now Patent No. 2,641,353 issued June 9, 1953, filed February 1, 1950 as a division of application, Serial No. 80,695, which matured into said Patent No. 2,554,077.

In the interest of reducing the showing of those features of the complete system which are old in the art and which are disclosed in the Weggum Patent No. 2,554,077, it may be pointed out that in the drawings I have illustrated only the rear portion of the stationary feeding conveyor which is comparable with the stationary conveyer 29—33 of the patent.

Referring particularly to Fig. 1 of the drawings I have illustrated the rear portion of a stationary conveyer 20 which, as shown in Fig. 2, includes an elongated longitudinally extending main frame 21 carrying troughing idlers 22 which normally support the upper and working run of an endless belt 23, the lower or return run of which is supported by idlers 24. In this particular illustrated embodiment of the invention the conveyer 20 is stationary and there is a plurality of loading or feeding devices designated 25, 26 and 27, respectively, movable longitudinally along the length of the stationary feeding conveyer 20 so that the material loading positions may be adjusted along the longitudinal length of said conveyer 20. It is to be understood within the scope of my invention in its broader aspects that, if desired, the feeding conveyer 20 may be longitudinally movable comparable with the trailing conveyer 16 in the Weggum Patent No. 2,554,077, in which case the loading devices 25, 26 and 27 may be stationary or movable.

In Fig. 1 of the drawings I have illustrated three loading devices 25, 26 and 27 as above described, the latter only being illustrated in dotted lines, thus indicating its presence as selective. The minimum number of such loading stations within the scope of my invention is two, the maximum number being variable as desired. Loading device 25 is not of special design and, per se, incorporates no feature novel with me and may, for example, follow the construction of comparable loading devices of the Weggum Patent No. 2,554,077, such, for example, as illustrated in Figs. 2, 3 and 4 thereof. It is to be noted, however, that its position in relation to the conveyer 20 is significant in that it is the first loading device, the upper or working run of the belt 23 moving from the left to the right as viewed in Fig. 1 of the drawings. The second loading device designated 26, and any and all subsequent loading devices, if any, which are represented by the loading device 27, are preferably of similar or identical construction and thus a description of the loading device 26, which is illustrated in some detail in Figs. 2 and 3 of the drawings, will suffice for an understanding of all of these loading devices except the first one, namely, loading device 25. Said loading device 26 includes a main frame 28 which is built up or fabricated from channels, angles, and the like, to form a general box-like gantry construction which straddles the stationary conveyer 20. The frame 28 is provided with a plurality of rollers or wheels 29 adapted to run on rails 30 which are spaced outwardly of and parallel with the stationary conveyer 20. This provides for free longitudinal movement of the loading device 26 along the longitudinal axis of the conveyer 20 so that the loading position of said device 26 may be adjusted along said conveyor 20.

Loading device 26 also includes a truck or trailer frame 31 which is fabricated of channel members and the like and at its rear end is provided with a pair of wheels 32 which ride on the rails 30. The front end of the frame 31 is pivotally attached to the frame 28 about a transverse horizontal axis. The truck or trailer frame 31 straddles the stationary conveyer 20, as does the frame 28, thus providing for free movement thereof as the complete loading device 26 is adjusted longitudinally along the conveyer 20. The trailer frame 31 is also provided with troughing idlers 33 which support the upper or working run of the belt 23, which belt 23 is lifted from the normal belt supporting idlers 22 of the conveyer 20 as said belt travels over the frame 31.

Immediately following the frame 31 in the direction of travel of the working run of the belt and carried by the frame 28 there is a belt tripper 34 which is of essentially standard construction and includes a pair of vertically spaced transversely and horizontally extending drums 35 and 36, the latter being positioned rearwardly and below the former. In common with belt trippers the working run of the belt 23 in traveling over drum 35 has its direction substantially reversed, which direction is again substantially reversed as it travels over the lower drum 36. The effect, of course, of the belt tripper 34 is to discharge the material from the working run of the belt 23 as it travels over the drum 35.

Immediately following the belt tripper 34 and positioned immediately ahead of and below the drum 35 and carried by the frame 28 there is a material receiving box 37 which is generally triangular in cross-section, as clearly illustrated in Fig. 2 of the drawings, having a generally horizontal transversely extending bottom and a generally vertical transversely extending back plate with two end plates sloping downwardly from the top of the back plate to the forward end of the bottom plate. The function of the box 37 is to accumulate material which is delivered by the working run of the belt 23 and thus provide what in effect is a chute formed of the material itself leading to the working run of the belt 23 where it is loaded in a manner hereinafter described more completely.

The working run of the belt 23 after leaving the drum 36 travels under the box 37 where it is supported on spaced troughing idlers and travels to a plurality of closely spaced cushioning idlers 38 carried by the frame 28. The cushioning idlers 38 follow the belt tripper 34 and more particularly immediately after the material box 37 and constitute means for cushioning the forces produced by the delivery of material to the belt 23 as it passes over said cushioning idlers 38. It is further, of course, obvious that the cushioning idlers 38 support the working run of the belt 23 above the normal belt supporting idlers 22 of the conveyer 20 as said working run of the belt 23 travels through the loading device 26. Shortly after leaving cushioning idlers 38 the working run of the belt 23 is supported by the conveyer idlers 22.

Material to be delivered to the belt 23 by the loading device 26 which was not previously carried thereby may be supplied by any type of feeding device, hopper, or the like. In the drawings I have illustrated one form of said device comprising a belt feeder 39 which is adapted to receive material from a branch feeding conveyer, shovel, bucket, or the like, and deliver it along a path as illustrated in Fig. 2 of the drawings wherein it is mixed or intermingled with the material discharged over the drum 35 and flows down the chute formed by the material which builds up in the material box 37. Materials delivered over the drum 35 and from the feeder 39 are received by a hopper 40 (see Fig. 3) which is formed of a pair of side plates 41, 41 and an end plate 42 (see Fig. 2), preferably being open at the remote or right-hand end as viewed in Fig. 2 of the drawings. The material box 37 is mounted adjacent the receiving end and within the hopper 40.

As best illustrated in Fig. 3 of the drawings, the bottom portions of the hopper 41 are provided with skirts 43 which are shown sloping inwardly and which are positioned closely adjacent the upper surface of the working run of the belt 23 and thus prevent any significant spillage of material from the belt 23 as the material is delivered thereto within the hopper 40. The skirts 43 also co-operate to concentrate the material adjacent the center portion of the working run of the belt 23.

From the above description it will be evident that any of the loading devices 25, 26 or 27, etc. may be adjusted longitudinally along the conveyer 20 to various desired loading positions. The loading device 26 and any subsequent loading device which is preferably of the same general construction operates in the following manner. The material carried on the working run of the belt 23 which has been delivered thereto by a previous loading device is carried by said working run as it travels up the incline of the truck or trailer 31 and is discharged from the belt 23 as it passes over the drum 35 of the belt tripper 34. This material in discharging will be mixed with any material fed to the hopper 40 by the feeder 39 and the mixed material preferably rolled down the incline formed by accumulated material in the box 37 which is within the hopper 40. This, of course, means that the amount of material thereafter carried by the working run of the belt 23 will be increased by whatever amount is delivered by feeder 39. Material thus delivered to the working run of the belt 23 as it travels under the closely adjacent bottom edges of the skirts 43 of the hopper 40, while being supported on the cushioning idlers 38, will normally be higher or thicker, or, in other words, greater in amount per unit of length than the material on said working run of belt 23 as it comes up to the tripper 34.

The reason for using the tripper 34 is because it is exceedingly desirable to have the bottom edges of the hopper 40, as provided by the skirts 43, positioned closely adjacent or substantially in contact with the upper surface of the belt 23 as it passes over the cushioning idlers 38. This, of course, requires that as the belt 34 first starts to pass under the hopper 40 and particularly adjacent the skirts 43 it be free of any load. Otherwise the skirts 43 would tend to act as plows and push the material off the belt 23 as it passed under the hopper 40. On the other hand, if the bottom edges of the hopper 40 were spaced above the belt 23 sufficient to allow significant loads of material thereon to pass under the hopper without contacting its bottom there would be very significant and undesirable leakages of material, causing dust as well as loss of material as it was fed to the belt 23 through the hopper 40. Thus by providing a load-free area of the working run of the belt 23 as it first moves over the cushioning idlers 38 and under the hopper 40 it is possible to provide an effective seal between the lower edges of said hopper 40 and the upper surface of the belt 23 within the active working portion of said hopper 40.

I have found from experience that this improved relation of parts fully justifies the additional expense of adding the tripper 34 with its continual removal of the material from the upper run of the belt 23 as it enters the loading device 26 and its immediate return to the working run of the belt 23 within the hopper 40 while said belt 23 is supported by the cushioning idlers 38. It is, of course, evident that in operation there may well be occasions when the working run of the belt 23 is carrying no material to the loading device 26 and the only material being loaded on said belt 23 will be that delivered by the feeder 39. It is also evident that on occasions material will be delivered by the belt 23 to the feeding device 26 while no material is being delivered by the feeder 39. The feeding device 26 operates satisfactorily under all of the normal conditions of operation including those above mentioned.

If desired, the frame 28 may also be provided with a plurality of swing hammers 44 swingably mounted upon a transverse horizontal shaft 45, said hammers 44 being located just to the right of the area, as seen in Fig. 2 of the drawings, within which material fed by both the tripper 34 and the feeder 39 enters the hopper 40. These hammers 44 act to break up any large lumps of material and are intended to smooth out the flow of material within the hopper 40 and onto the belt 23 as it travels over the cushioning idlers 38.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. In a conveyor system, the combination with an elongated conveyer including an elongated frame carrying idlers adapted normally to support a belt, an elongated endless belt normally carried by said idlers and adapted to be loaded by a plurality of devices spaced along its working run, at least one of said loading devices other than the first one including a frame, means mounting said conveyer frame and said loading device frame for relative movement along the axis of the former whereby the belt may be loaded at different positions along the conveyer frame, said one loading device also including a belt tripper carried by said loading device frame, cushion idler means carried by said loading device frame and positioned above the conveyer frame and normal belt carrying idlers and operative to lift the working run of the belt off said normal belt carrying idlers while said working run is traveling over said loading device frame, said cushion idlers following said belt tripper, feeder skirts on said loading device frame having their bottom edges closely adjacent said working run of said belt as it travels over said cushion idlers, and means for pouring additional material into that pouring over said tripper thereby mixing said materials as they are delivered to the working run of said belt above said cushion idler means.

2. In a conveyor system, the combination with an elongated conveyer including an elongated frame carrying idlers adapted normally to support a belt, an elongated endless belt normally carried by said idlers and adapted to be loaded by a plurality of devices spaced along its working run, at least one of said loading devices including a frame, means mounting said conveyer frame and said loading device frame for relative movement along the axis of the former whereby the belt may be loaded at different positions along the conveyer frame, said one loading device also including a belt tripper carried by said loading device frame, cushion idler means carried by said loading device frame and positioned above the conveyer frame and normal belt carrying idlers and operative to lift the working run of the belt off said normal belt carrying idlers while said working run is traveling over said loading device frame, said cushion idlers following said belt tripper, feeder skirts on said loading device frame having their bottom edges closely adjacent said working run of said belt as it travels over said cushion idlers, and means for pouring additional material into that pouring over said tripper thereby mixing said materials as they are delivered to the working run of said belt above said cushion idler means.

3. In a conveyer system, the combination with an elongated conveyer including an elongated frame carrying idlers adapted normally to support a belt, an elongated endless belt normally carried by said idlers and adapted to be loaded by a plurality of devices spaced along its working run, at least one of said loading devices including a frame, means mounting said conveyer frame and said loading device frame for relative movement along the axis of the former whereby the belt may be loaded at different positions along the conveyer frame, said one loading device also including a belt tripper carried by said loading device frame, cushion idler means carried by said loading device frame and positioned above the conveyer frame and normal belt carrying idlers and operative to lift the working run of the belt off said normal belt carrying idlers while said working run is traveling over said loading device frame, said cushion idlers following said belt tripper, and means for pouring additional material into that pouring over said tripper thereby mixing said materials as they are delivered to the working run of said belt above said cushion idler means.

4. In a conveyor system, the combination with an elongated conveyer including an elongated frame carrying idlers adapted normally to support a belt, an elongated endless belt normally carried by said idlers and adapted to be loaded by a plurality of devices spaced along its working run, at least one of said loading devices including a frame, means mounting said conveyer frame and said loading device frame for relative movement along the axis of the former whereby the belt may be loaded at different positions along the conveyer frame, said one loading device also including a belt tripper carried by said loading device frame, cushion idler means carried by said loading device frame and positioned above the conveyer frame and normal belt carrying idlers and operative to lift the working run of the belt off said normal belt carrying idlers while said working run is traveling over said loading device frame, said cushion idlers following said belt tripper, means for delivering additional material to that flowing over said tripper which is mixed therewith and delivered to the working run of said belt above said cushion idlers, and a material receiving box positioned to receive material from said tripper and provide a sloping surface of material over which other material from both said belt and said additional material delivering means flows onto the belt as it travels over said cushioning idler means.

5. A material handling device adapted to add material being conveyed by the working run of an endless belt conveyer and to mix the added material therewith in so doing including a tripper adapted to cause material being conveyed to be discharged from one portion of the working run of said conveyer to another, means forming a hopper having said last named portion of said working run disposed to convey material therefrom, said tripper causing material being conveyed by said first working run portion to discharge into said hopper, cushion idler means operative to support said second working run portion of said conveyer where the latter receives material, a material receiving box positioned to receive material from said first working run and provide a sloping surface of material over which other material flows onto said second working run portion, and feeder means for feeding additional material into the material discharged from said first working run and mixing it therewith, the mixed material then being conveyed from said hopper by said second working run portion of the conveyer.

6. A material handling device adapted to add material being conveyed by the working run of an endless belt conveyer and to mix the added material therewith in so doing including a tripper adapted to cause material being conveyed to be discharged from one portion of the working run of said conveyer to another, means forming a hopper having said last named portion of said working run disposed to convey material therefrom, said tripper causing material being conveyed by said first working run portion to discharge into said hopper, a material receiving box positioned to receive material from said first working run and provide a sloping surface of material over which other material flows onto said second working run portion, and feeder means for feeding additional material into the material discharged from said first working run and mixing it therewith, the mixed material then being conveyed from said hopper by said second working run portion of the conveyer.

7. A material handling device adapted to add material being conveyed by the working run of an endless belt conveyer and to mix the added material therewith in so doing including a tripper adapted to cause material being conveyed to be discharged from one portion of the working run of said conveyer to another, means forming a hopper having said last named portion of said working run disposed to convey material therefrom, said tripper causing material being conveyed by said first working run portion to discharge into said hopper, a material receiving box positioned in said hopper to receive material and to provide a surface of material over which other material flows onto said second working run portion, and feeder means for feeding additional material into the material discharged from said first working run and mixing it therewith, the mixed material then being conveyed from said hopper by said second working run portion of the conveyer.

8. A material handling device adapted to add material being conveyed by the working run of an endless belt conveyer and to mix the added material therewith in so doing including a tripper adapted to cause material being conveyed to be discharged from one portion of the working run of said conveyer to another, means forming a hopper having said last named portion of said working run disposed to convey material therefrom, said tripper causing material being conveyed by said first working run portion to pour into said hopper, and feeder means for feeding additional material into the material pouring from said first working run and mixing it therewith, the mixed material then being conveyed from said hopper by said second working run portion of the conveyer.

9. A material handling device adapted to mix material with material being conveyed by the working run of an endless conveyer including a tripper adapted to cause material being conveyed to be discharged from one portion of the working run of said conveyer to another, means forming a hopper having said last named portion of said working run travelling to convey material therefrom, said tripper causing material being conveyed by said first working run portion to pour into said hopper, and feeder means for pouring additional material into the material pouring into said hopper whereby said mixed materials will be conveyed from said hopper by said second working run portion of said conveyer.

References Cited in the file of this patent

UNITED STATES PATENTS

| 778,461 | Robb | Dec. 27, 1904 |
| 825,292 | Bergert | July 10, 1906 |
| 1,320,090 | Pratt | Oct. 28, 1919 |
| 1,820,521 | Allen | Aug. 25, 1931 |
| 2,554,077 | Weggum | May 22, 1951 |

FOREIGN PATENTS

| 507,626 | Germany | Sept. 18, 1930 |
| 545,914 | Great Britain | June 18, 1942 |